Figure 1:
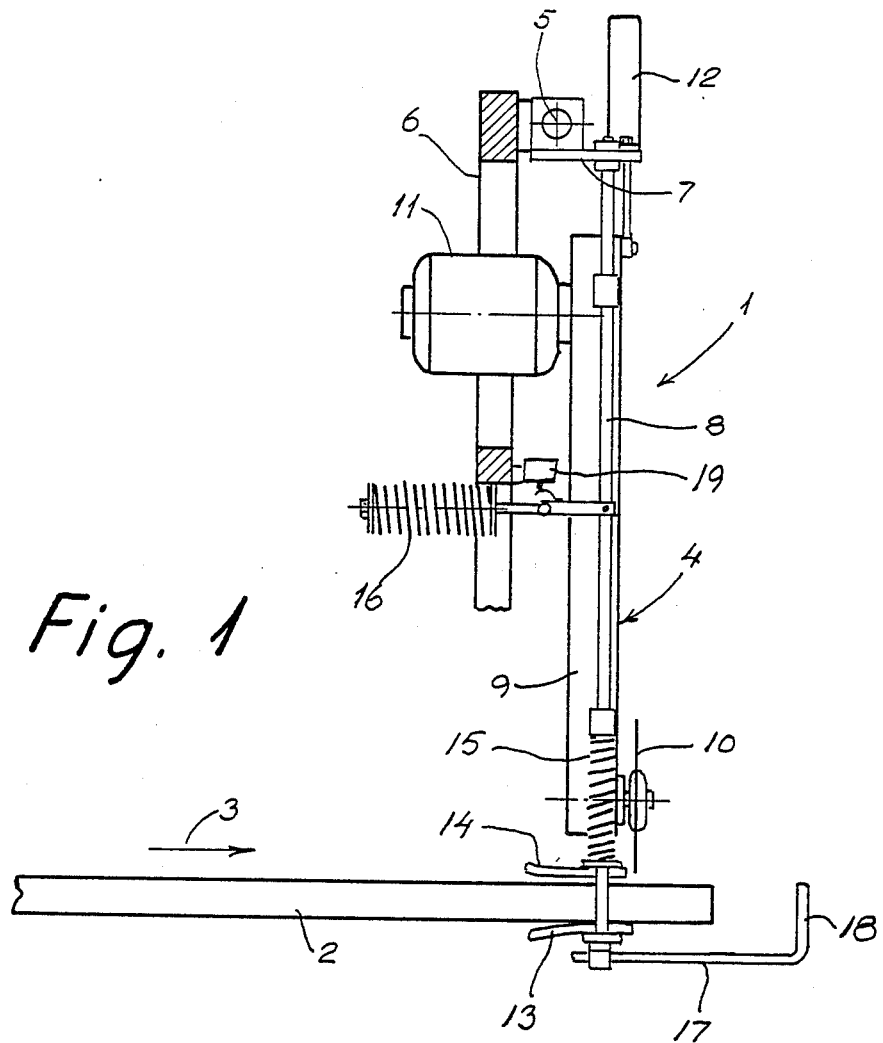

United States Patent [19]

Kristensen

[11] Patent Number: 4,740,149

[45] Date of Patent: Apr. 26, 1988

[54] APPARATUS FOR CUTTING PIECES HAVING A PREDETERMINED LENGTH AND USE OF THE APPARATUS IN CONNECTION WITH A FOOD EXTRUDER

[75] Inventor: Jørgen K. Kristensen, Laerkevej, Denmark

[73] Assignee: Atlas Danmark A/S, Ballerup, Denmark

[21] Appl. No.: 930,404

[22] PCT Filed: Jan. 31, 1986

[86] PCT No.: PCT/DK86/00011

§ 371 Date: Nov. 26, 1986

§ 102(e) Date: Nov. 26, 1986

[87] PCT Pub. No.: WO86/04538

PCT Pub. Date: Aug. 14, 1986

[30] Foreign Application Priority Data

Feb. 1, 1985 [DK] Denmark ............................. 449/85

[51] Int. Cl.⁴ ............................................. B28B 7/14
[52] U.S. Cl. ..................................... 425/308; 83/319; 264/148; 425/315
[58] Field of Search ................. 83/319; 425/308, 315, 425/376 R, 377, 512, 518; 264/148

[56] References Cited

U.S. PATENT DOCUMENTS

| | | |
|---|---|---|
| 1,625,850 | 4/1927 | Gedien et al. |
| 1,690,209 | 11/1928 | Smith |
| 1,917,187 | 7/1933 | Conti |
| 1,944,718 | 1/1934 | Rafter |
| 3,143,021 | 8/1964 | Vom Dorp |
| 3,528,329 | 9/1970 | Chartet |
| 3,776,082 | 12/1973 | Plegat |
| 3,808,861 | 5/1974 | Plegat |
| 4,340,557 | 7/1982 | Gross ............................. 264/148 X |
| 4,503,006 | 3/1985 | Kato ................................... 264/148 |
| 4,616,542 | 10/1986 | Hards ................................... 83/319 |

FOREIGN PATENT DOCUMENTS

1165969 3/1964 Fed. Rep. of Germany.

Primary Examiner—Charles Hart
Attorney, Agent, or Firm—Kerkam, Stowell, Kondracki & Clarke

[57] ABSTRACT

Apparatus for cutting pieces of a predetermined length from a string of material by means of a rotary saw blade, said string being conveyed intermittently and at irregular speed. To meet this object without the apparatus being more than modestly space-demanding at the three sides of the string, the saw blade is mounted on a transmission (9), which is mounted on a lever (4) extending substantially at a right angle to the string substantially where the cutting is to be performed and pivotable around an axle (5) perpendicular to the string, which lever comprises gripping means (13, 14) for holding the lever unmovable with respect to the string, the transmission (9) being displaceable with respect to the lever to provide the feeding of the saw blade. The apparatus is used for cutting extruded strings of frozen food, an apparatus being placed at each of several strings being extruded simultaneously at an acute angle with respect to the axis of the extruder.

4 Claims, 2 Drawing Sheets

APPARATUS FOR CUTTING PIECES HAVING A PREDETERMINED LENGTH AND USE OF THE APPARATUS IN CONNECTION WITH A FOOD EXTRUDER

The present invention relates to an apparatus for cutting into pieces of predetermined length strings of material by means of a rotary saw blade, said strings being conveyed intermittently and at irregular speed.

In cutting moving strings of material it is common to run a saw blade crosswise through the string, the travel path of the saw blade in relation to the string forming an angle which diverges slightly from the angle under which the string is to be cut. In this way the movement of the string during the cutting is compensated for. However, this commonly known technique cannot be applied when the material is not conveyed at regular speed, as the angle of the travel path of the saw blade is varying in a way which cannot be predicted.

It is the object of the present invention to produce an apparatus capable of solving this task, which task also comprises reducing the need for space on the three sides of the string material.

According to the invention this purpose is achieved by means of the features stated in claim 1. By mounting the saw blade and its transmission on a lever, the axis of rotation of which is situated at a distance from the place of cutting, the lever and the saw blade are brought to follow the movement of the material during the cutting under a very limited variation of angle. The lever comprises a gripping device which ensures that the saw blade is exactly following the string of material during cutting which is performed by the transmission being displaced relative to the lever. The apparatus does in fact grip around the string, but does not comprise space demanding devices on the three sides thereof, only on the fourth side, viz. the lever which extends at almost right angle to the string.

According to the invention it is advantageous that the gripping device comprises one part being stationary in relation to the lever and another part being movable and attached to the transmission and being displaceable against a spring load with respect to the transmission. Thereby, an automatic activation of the gripper device is attained at the beginning of the feeding or cutting movement of the saw blade, and the gripper device will remain activated until the saw blade-after termination of the cutting process is brought out of contact with the string of material.

In a preferred embodiment according to the invention a gauge is positioned on the lever, said gauge being adjustable to the desired length and being placed in the path of movement of the string material, an activation means being arranged in connection with the lever capable of starting the travel moment of the saw blade when the lever is moved caused by the string of material engaging the gauge.

The invention further comprises the use of the apparatus according to claim 1 in cutting pieces having a predetermined length from frozen food in the form of strings which are extruded from neighbouring openings in an extruder nozzle. In use, the extruded strings are made to form an acute angle with the extension of the extruder axis, a cutting device being placed by each string in circle around the extension of the extruder axis. In this way the problems in cutting the extruded strings of material fed at differing and irregular speed are solved. Due to the small demand for space at the three sides of the cutting devices, there will be no difficulty in arranging the apparatuses side by side in a circle even if for instance 10 or more strings are to be extruded simultaneously.

In the following the invention will be explained with reference to the embodiments shown in the drawing. In the drawing FIG. 1 shows the cutting apparatus according to the invention, in side elevation, and FIG. 2 shows a use in accordance with the invention of the cutting apparatuses in connection with an extruder for the production of frozen food.

Figure 2:
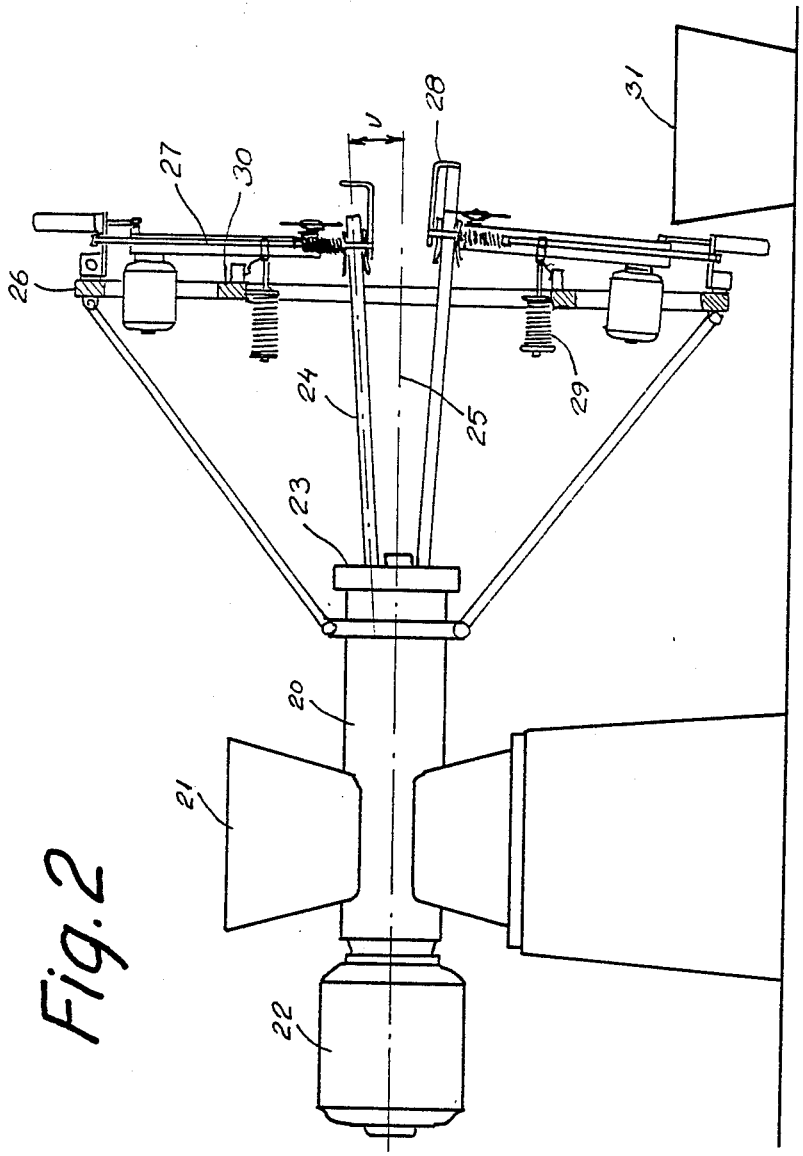

The cutting apparatus 1 shown in FIG. 1 is adapted for cutting pieces of a predetermined length from a string of material 2. The strings of material 2 are conveyed intermittently and at irregular speed in the direction of the arrow 3. The apparatus comprises a lever 4, which is pivotably mounted on an axle 5 extending perpendicular to the string of material at some distance therefrom and in a plane which is approximately placed where the cutting is to be performed. The axle is mounted on a frame in firm connection with the machine, for instance an extruder, which produces the string of material 2. The lever 4 is connected to the axle 5 by means of an upper bracket 7 on which the main members 8 of the lever are mounted. The main members form guide means for a transmission 9 in the form of a transmission housing, at the lower end of which in relation to the orientation of the figure a rotating saw blade 10 is mounted. At the upper part of the housing a motor 11 is provided as a power source for the saw blade. The housing contains the transmission between the motor 11 and the saw blade 10, for instance in the form of a tooth belt.

To the bracket 7 a driving cylinder 12 is mounted by means of which a displacement of the transmission 9 with respect to the main members can be performed. This displacement serves for feeding the saw blade in cutting the string of material, but it also, as will appear from the following, causes the lever 4 to be kept in a fixed position in relation to the string of material during the cutting operation.

To the lower part of the main stays a gripper device 13 is attached, against which the string of material will glide under the forward movement thereof. Above the string of material 2 and with clearance a movable gripper means 14 is positioned, said device being displaceable with respect to the main members 8 of the lever and against the action of a spring 15 with respect to the transmission 9. By activating the driving cylinder 12, the movable gripper device will thus at the first part of the movement of the transmission 9 be brought into contact with the string of material so that the lever will be moved in synchronism with the string of material during the cutting operation. This contact will remain until the saw blade has been removed to approximately the initial position of the transmission 9. The lever is kept in a fixed initial position by means of a spring 16 or the like. On the gripping devices 13 a gauge 17 is mounted having an abutment portion 18 placed in the moving path of the string 2. When the string 2 has been extruded to a length corresponding to the predetermined length, the abutment portion 18 is hit by the string, whereby the lever is moved in the direction of the arrow 3. By this a microswitch or a corresponding activation member is activated thereby starting a cutting cycle. This cycle comprises activating the cylinder 12, which at the end of its stroke is returning to its starting position. During this cycle the gripping device is in engagement with the string of material, and this engagement remains also after the string has been cut through, so that the saw blade will not cut marks in the end face of the string during the return stroke of the transmission 9.

The main use of the cutting apparatus according to the invention is to cut extruded strings made from frozen food into pieces, said strings being extruded from an extruder nozzle through a number of openings arranged in a circle. Even though the strings are extruded under seemingly equal condition, the velocity of extrusion is neither constant nor equal for the neighbouring strings. A simultaneous cutting of all strings will result in pieces of uneven lengths which will not be satisfactory for instance in a following packing operation. When using the cutting apparatus according to the invention an apparatus is arranged for each of the strings. FIG. 2 shows a set up for such use of the cutting apparatus.

An extruder 20 with a filling funnel 21 and a driving motor 22 is provided with a nozzle 23 from which a number of strings 24 are extruded—in the present case two, but in practice ten or more may be extruded, the nozzle having such form that the strings will form an acute angle to the extension of the extruder axis 25. Around this extended axis a circular frame 26 is placed, said frame possible being braced with respect to the extruder 20. This frame serves for supporting as many apparatuses 27 of the type mentioned above as there are strings of material present. Each apparatus has a gauge 28 and is connected by means of a spring to an inner portion 30 of the circular frame 26. When a predetermined length of string has been extruded, each apparatus 27 will therefore be able to perform a cutting, the cut pieces being gathered in a receiver 31 or on a conveyor belt before they are brought forward in the production process. The inner portions 30 of the frame may further serve for fastening guide and carrying rails (not shown) for the individual strings 24.

I claim:

1. Apparatus for cutting pieces of a predetermined length from a string of material by means of a rotary saw blade, means for conveying said string intermittently and at an irregular speed, means for mounting the saw blade on a transmission, means for mounting said transmission on a lever extending substantially at a right angle to the string substantially where the cutting is to be performed means for pivotally mounting said lever around an axle perpendicular to the string, gripping means on said lever for holding the lever unmovable with respect to the string, means for translating the transmission with respect to the lever to move the saw blade into its cutting position for cutting a length of material from the string, the gripping means comprising first and second parts being spaced from each other to receive the string therebetween, said first part being fixed with respect to the lever, and said second part being connected with and displaceable with respect to the transmission against the action of a spring affixed to the lever.

2. Apparatus according to claim 1 wherein a guage is arranged on the lever with an abutment in the path of the string, activating means being connected with the lever for initiating feeding movement of the saw blade into its cutting position when the lever is moved by the end of the string abutting the gauge.

3. Apparatus according to claim 1 for cutting into pieces predetermined lengths of a number of strings of material wherein said strings of material are a frozen food, means for extruding a plurality of strings of material simultaneously from openings arranged side by side in a circle in a nozzle of an extruder, the extruded strings forming an acute angle with the axis of the extruder, and at each position of the string where the cutting is to be performed a rotary saw blade, said blades being arranged in a circle having as its axis the axis of the extruder.

4. Apparatus according to claim 3 further including a gauge on the lever having an abutment in the path of the string, activating means being connected with the lever for causing movement of the saw blade into its cutting position when the lever is moved by the end of the string abutting the gauge.

* * * * *